US011023536B2

(12) United States Patent
Rabe et al.

(10) Patent No.: US 11,023,536 B2
(45) Date of Patent: Jun. 1, 2021

(54) SOCIAL NETWORK SYSTEM WITH RELEVANCE SEARCHING

(71) Applicant: Oracle International Corporation, Redwood Shores, CA (US)

(72) Inventors: Daniel G. Rabe, Lafayette, CO (US); Jeffrey Olkin, Princeton, NJ (US); Ana Ramirez Chang, Boulder, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 679 days.

(21) Appl. No.: 13/719,451

(22) Filed: Dec. 19, 2012

(65) Prior Publication Data
US 2014/0172845 A1 Jun. 19, 2014
US 2016/0224546 A9 Aug. 4, 2016

Related U.S. Application Data

(60) Provisional application No. 61/640,913, filed on May 1, 2012.

(51) Int. Cl.
G06F 16/93 (2019.01)
G06Q 50/00 (2012.01)
(Continued)

(52) U.S. Cl.
CPC .......... G06F 16/93 (2019.01); G06F 16/9535 (2019.01); G06Q 10/10 (2013.01); G06Q 50/01 (2013.01)

(58) Field of Classification Search
CPC .............. G06Q 50/01; G06F 17/30648; G06F 17/30011; G06F 17/30274; G06F 16/9535; G06F 16/93
(Continued)

(56) References Cited

U.S. PATENT DOCUMENTS 6,662,164 B1 12/2003 Koppelman
7,447,647 B1 11/2008 Shedlack
(Continued)

FOREIGN PATENT DOCUMENTS

WO 2009120775 A1 10/2009
WO 2011163147 A3 3/2012

OTHER PUBLICATIONS

"Data Sheet for Salesforce Chatter", http://www.salesforce.com/events/docs/DS_Chatter_2010-04-02.pdf; last downloaded Sep. 18, 2012.
(Continued)

Primary Examiner — Ashish Thomas
Assistant Examiner — Nargis Sultana
(74) Attorney, Agent, or Firm — Potomac Law Group, PLLC

(57) ABSTRACT

A social network system that provides a keyword search result set from content within the social network receives from an enterprise application a business object and an associated system of record, and generates a social object for the social network, where the social object corresponds to the business object and associated system of record. The system generates a plurality of conversations related to the social object, where each conversation comprises content. The system indexes each of the conversations as a conversation document and receives a keyword search term. The system then searches for the keyword search term within the conversation documents, and generates a result set of relevant conversations in response to the searching, where the relevant conversations are displayed in order of relevance.

20 Claims, 17 Drawing Sheets

(51) Int. Cl.
  *G06F 16/9535* (2019.01)
  *G06Q 10/10* (2012.01)
(58) Field of Classification Search
  USPC .......................................... 707/728; 705/319
  See application file for complete search history.

(56) References Cited

U.S. PATENT DOCUMENTS

| | | | |
|---|---|---|---|
| 7,739,139 B2* | 6/2010 | Robertson | H04L 63/0263 705/7.12 |
| 7,886,000 B1* | 2/2011 | Polis | H04L 67/2833 709/203 |
| 8,171,087 B2* | 5/2012 | Carrer | H04L 51/04 709/206 |
| 8,819,150 B1* | 8/2014 | Osinga | H04L 51/16 709/206 |
| 9,253,137 B1* | 2/2016 | Jackson | H04L 51/32 |
| 9,672,555 B1* | 6/2017 | Dillard | G06Q 30/0282 |
| 2004/0122803 A1 | 6/2004 | Dom et al. | |
| 2004/0128285 A1* | 7/2004 | Green | H04L 29/06 |
| 2005/0223058 A1* | 10/2005 | Buchheit | G06Q 10/107 709/203 |
| 2006/0064434 A1 | 3/2006 | Gilbert et al. | |
| 2008/0103907 A1* | 5/2008 | Maislos | G06Q 30/0277 705/14.54 |
| 2008/0109741 A1* | 5/2008 | Messing | G06Q 10/10 715/764 |
| 2008/0147487 A1* | 6/2008 | Hirshberg | G06Q 30/02 705/14.53 |
| 2008/0275701 A1* | 11/2008 | Wu | G06F 16/685 704/235 |
| 2009/0222448 A1* | 9/2009 | Caldwell | H04L 67/22 |
| 2009/0222750 A1* | 9/2009 | Jain | G06Q 10/00 715/767 |
| 2009/0292526 A1* | 11/2009 | Harari | G06F 40/205 704/9 |
| 2009/0305732 A1 | 12/2009 | Marcellino et al. | |
| 2009/0307592 A1 | 12/2009 | Kalanithi et al. | |
| 2010/0070485 A1* | 3/2010 | Parsons | G06Q 30/0264 707/709 |
| 2010/0125803 A1* | 5/2010 | Johnson | G06F 16/954 715/760 |
| 2010/0169159 A1* | 7/2010 | Rose | G06Q 30/0278 705/7.29 |
| 2010/0169327 A1* | 7/2010 | Lindsay | H04L 51/00 707/750 |
| 2010/0198757 A1* | 8/2010 | Cheng | G06Q 10/06 706/12 |
| 2010/0211917 A1 | 8/2010 | Tsuei | |
| 2010/0318613 A1 | 12/2010 | Souza et al. | |
| 2010/0325107 A1* | 12/2010 | Kenton | G06Q 30/00 707/723 |
| 2011/0035677 A1 | 2/2011 | Vitale et al. | |
| 2011/0113072 A1* | 5/2011 | Lee | G06F 16/2282 707/802 |
| 2011/0113349 A1 | 5/2011 | Kiciman et al. | |
| 2011/0137902 A1* | 6/2011 | Wable | G06F 16/248 707/737 |
| 2011/0161827 A1 | 6/2011 | Dedis et al. | |
| 2011/0179025 A1* | 7/2011 | Chuang | G06F 16/24578 707/728 |
| 2011/0246920 A1* | 10/2011 | Lebrun | G06Q 30/02 715/769 |
| 2011/0314017 A1* | 12/2011 | Yariv | H04L 51/02 707/737 |
| 2012/0001919 A1* | 1/2012 | Lumer | H04L 67/22 345/440 |
| 2012/0011039 A1 | 1/2012 | Cina et al. | |
| 2012/0110096 A1* | 5/2012 | Smarr | H04W 4/21 709/206 |
| 2012/0143972 A1* | 6/2012 | Malik | H04L 51/36 709/206 |
| 2012/0158501 A1* | 6/2012 | Zhang | G06Q 30/0255 705/14.53 |
| 2012/0179752 A1* | 7/2012 | Mosley | G06F 16/951 709/204 |
| 2012/0197809 A1 | 8/2012 | Earl et al. | |
| 2012/0245963 A1* | 9/2012 | Peak | G06Q 10/10 705/4 |
| 2012/0254184 A1* | 10/2012 | Choudhary | G06Q 50/01 707/738 |
| 2012/0254902 A1* | 10/2012 | Brown | G06F 9/541 719/328 |
| 2012/0290448 A1* | 11/2012 | England | G06Q 30/0282 705/27.2 |
| 2012/0290950 A1* | 11/2012 | Rapaport | H04N 21/8358 715/753 |
| 2012/0331053 A1* | 12/2012 | Dunn | G06Q 50/01 709/204 |
| 2013/0024511 A1* | 1/2013 | Dunn | G06Q 10/10 709/204 |
| 2013/0024788 A1* | 1/2013 | Olsen | G06Q 10/107 715/753 |
| 2013/0073280 A1* | 3/2013 | O'Neil | G06F 40/20 704/9 |
| 2013/0091217 A1* | 4/2013 | Schneider | G06Q 50/01 709/204 |
| 2013/0097320 A1* | 4/2013 | Ritter | G06Q 10/06 709/226 |
| 2013/0124437 A1* | 5/2013 | Pennacchiotti | G06N 20/00 706/12 |
| 2013/0166721 A1* | 6/2013 | Softer | G06Q 50/01 709/224 |
| 2013/0173368 A1* | 7/2013 | Boutin | G06F 16/27 705/14.16 |
| 2013/0185143 A1* | 7/2013 | Damman | G06F 16/93 705/14.41 |
| 2013/0198275 A1* | 8/2013 | Forsblom | H04L 67/306 709/204 |
| 2013/0262438 A1* | 10/2013 | Palay | G06F 16/3334 707/722 |
| 2013/0262595 A1* | 10/2013 | Srikrishna | G06F 16/38 709/206 |
| 2014/0012927 A1* | 1/2014 | Gertzfield | G06F 16/252 709/206 |
| 2014/0189524 A1* | 7/2014 | Murarka | G06F 16/958 715/744 |
| 2014/0189539 A1* | 7/2014 | St. Clair | G06Q 50/01 715/753 |
| 2015/0263995 A1* | 9/2015 | Mahood | H04L 51/04 715/753 |

OTHER PUBLICATIONS

"Salesforce Chatter" http://www.salesforce.com/crm/sales-force-automation/sales-tracking/; last downloaded Jun. 5, 2012.
"IdeaPlaneKinetic Product"; http://ideaplane.com/products/features; copyright 2010-2012-IdeaPlane, last downloaded Jun. 5, 2012.
"Mark as Read for WordPress"; http://codecanyon.net/item/mark-as-read-for-wordpress/696983; last downloaded Jun. 5, 2012.
"Mapping Search Relevance to Social Networks"; http://www.socialnetworkanalysis.info/snakdd2009/AcceptedPapers/snakdd2009_submission_7.pdf; the 3rd SNA-KDD Workshop '09 (SNA-KDD'09), Jun. 28, 2009; Paris, France; Copyright 2009; ACM978-1-59593-848-0.
Clearvale Enterprise: The complete business social networking solution; http://www.clearvale.com/clearvale/mkt-nav/en/collateral/Clearvale_Enterprise.pdf; Redwood City, CA.
"IBM Connections"; http://www-01.ibm.com/software/lotus/products/connections/features.html?S_CMP=rnav; last downloaded Jun. 5, 2012.
Oracle Data Sheet; "Oracle on Track Communication"; 2011.
"F The Oracle Text Scoring Algorithm"; Oracle Text Reference; 11g Release 2 (11.2); http://docs.oracle.com/cd/E14072_01/text.112/e10944/ascore.htm; last downloaded Dec. 18, 2012.

(56) References Cited

OTHER PUBLICATIONS

Oracle, "Oracle on Track Communication White Paper"; Jun. 2011.
SB. Hecht et al.; "SearchBuddies: Bringing Search Engines into the Conversation"; Association for the Advancement of Artificial Intelligence; 2012.
"Enterprise Search Relevance Architecture Overview, Office 2007", msdn; http://msdn.microsoft.com/en-us/library/ms549085%28v=office.12%29.aspx; last downloaded Jun. 1, 2012.
Groofer get group smart; "What is groofer"; http://www.groofer.com/what-is-groofer; last downloaded Jun. 1, 2012.
A. Wable; "Intro to Facebook Search"; Mar. 16, 2010; http://www.facebook.com/note.php?note_id=365915113919.
"Bing Search Quality Insights: Whole Page Relevance"; http://www.bing.com/community/site_blogs/b/search/archive/2012/03/05/bing-search-quality-insights-whole-page-relevance.aspx; last downloaded Jun. 1, 2012.
Twitter Help Center; "About Top Seach Results"; https://support.twitter.com/articles/131209-what-are-top-tweets; last downloaded Jun. 1, 2012.
"Improving Relevance Office 2007"; msdn; http://msdn.mircorsoft.com/en-us/library/ms584432(d=printer,v=office.12); last downloaded Jun. 1, 2012.
About the Discussion Board; http:help.blackboard.com/instructor/content/_instructor_course/instructor_course_tool; last accessed on May 23, 2012.
Google Reader Sort on Unread Items; http:/userscripts.org/scripts/show/12287; last accessed on May 23, 2012.
How do I mark a message as read or unread?—Facebook Help Center/Facebook; http://www.facebook.com/help/?faq=213183835379234; last accessed on May 23, 2012.
http://learn.linkedin.com/inbox; last accessed on May 23, 2012.
PinguyOS; http:/forum.pinguyos.com/index.php; last accessed on May 23, 2012.
Plugins http://buddypress.org/extend/plugins/?search=BP+unread+post; last accessed on May 23, 2012.
Quickstart Guide: What Matters-Communications\Jive Community; https://community.jivesofware.com/docs/DOC-43665; Aug. 1, 2011.
Site Update: Unread Message Counts, Sta.sh Updates by $danlev and deviantArt; http://http://danlev.deviantart.com/journal/Site-Update-Unread-Message-Counts-Sta-sh-Updates-289171986?moodonly=1; last accessed on May 23, 2012.
Socialcast; http://socialcast.com/team-collaboration; last accessed on May 23, 2012.
TDash-Online Twitter Client That Makes Managing Unread Tweets Easy; http://www.makeuseof.com/tag/webbased-twitter-client-tdash-lets-manage-unread-tweets-ease/; last accessed on May 23, 2012.
Unread Posts <<bbPress Plugin Browser; http://bbpress.org/plugins/topic/unread-posts/; last accessed on May 23, 2012.
www.yammer.com; "Introducing: Group Counters & Network Notifications" 2011.

* cited by examiner

SOCIAL NETWORK SYSTEM WITH RELEVANCE SEARCHING

CROSS REFERENCE TO RELATED APPLICATIONS

This application claims priority of Provisional Patent Application Ser. No. 61/640,913, filed on May 1, 2012, the contents of which is hereby incorporated by reference.

FIELD

One embodiment is directed generally to a networked computer system, and in particular to a social network system that provides keyword searching and relevance of the search results.

BACKGROUND INFORMATION

A social network service or system, or "social network", is an online service, platform, or site that focuses on facilitating the building of social networks or social relations among people who, for example, share interests, activities, backgrounds, or real-life connections. A social network service typically includes a representation of each user, typically referred to as a user "profile", his/her social links, and a variety of additional services. Most social network services are web-based and provide means for users to interact over the Internet, such as e-mail and instant messaging. Social networking sites allow users to share ideas, activities, events, and interests within their individual networks.

The use of social network services in an enterprise/business context is increasingly popular. Because social networks connect people at low cost, they can be beneficial for entrepreneurs and small businesses looking to expand their contact bases. These networks often act as a customer relationship management tool for companies selling products and services. Companies can also use social networks for targeted advertising in the form of banners and text ads. Since businesses operate globally, social networks can make it easier to keep in touch with contacts around the world.

SUMMARY

One embodiment is a social network system that provides a keyword search result set from content within the social network. The system receives from an enterprise application a business object and an associated system of record, and generates a social object for the social network, where the social object corresponds to the business object and associated system of record. The system generates a plurality of conversations related to the social object, where each conversation comprises content. The system indexes each of the conversations as a conversation document and receives a keyword search term. The system then searches for the keyword search term within the conversation documents, and generates a result set of relevant conversations in response to the searching, where the relevant conversations are displayed in order of relevance.

BRIEF DESCRIPTION OF THE DRAWINGS

FIG. 3 is a screenshot showing an example social object in accordance with one embodiment of the present invention.

FIG. 5 is a screenshot showing another example social object in accordance with one embodiment of the present invention.

FIG. 8 is a screenshot showing the example business object of FIG. 7 after the New Related Conversation button has been selected in accordance with an embodiment of the present invention.

FIG. 9 is a screenshot showing the example business object of FIG. 6 after the conversations tab is selected in accordance with an embodiment of the present invention.

Figure 14:
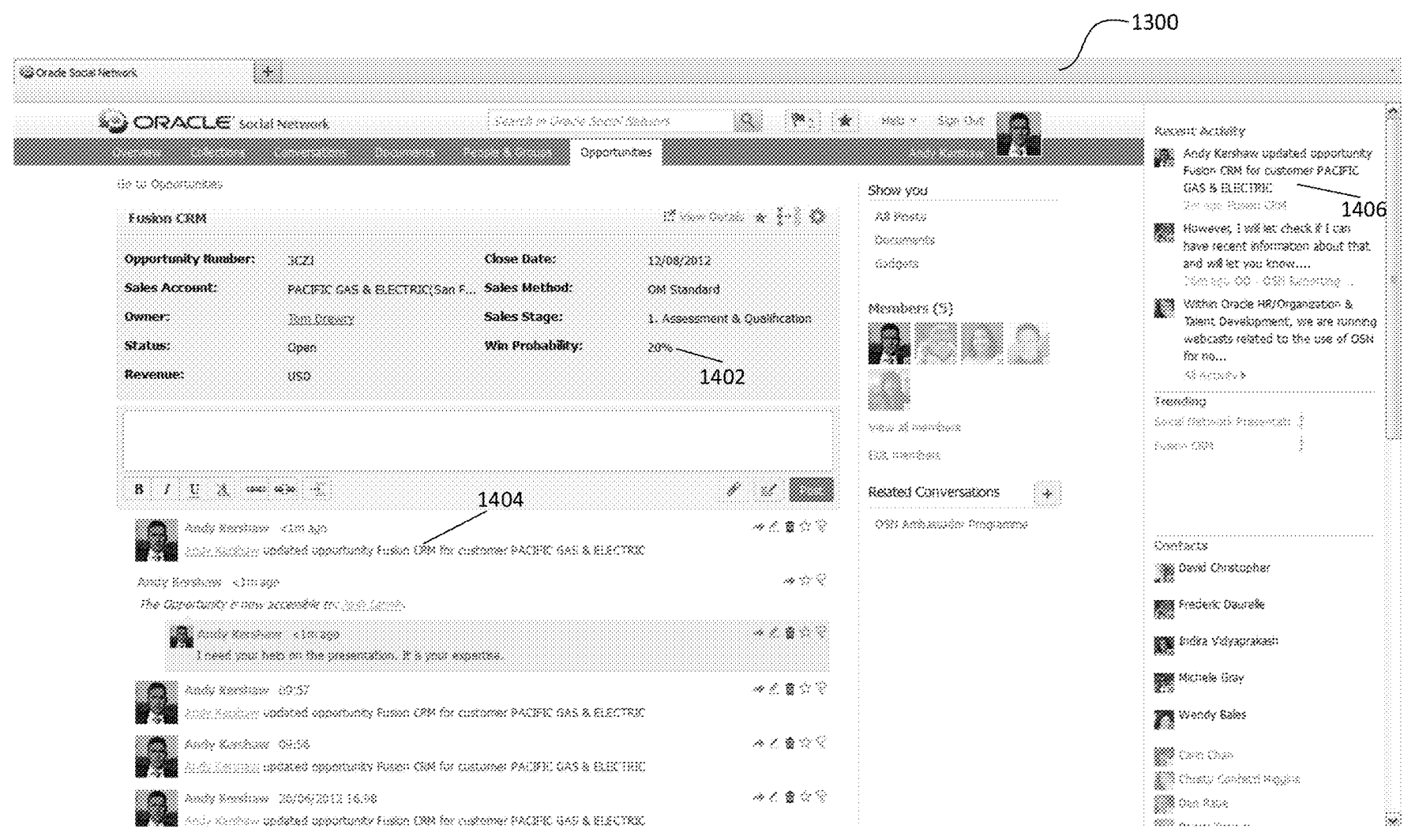

FIG. 14 is a screenshot showing the social object of FIG. 13.

DETAILED DESCRIPTION

One embodiment is a social network system that creates social objects that correspond to business objects from enterprise business applications. The social network system further enables the creation of related conversations for a social object, and each conversations can include multiple messages. A search functionality allows the most relevant conversations to be determined in response to search terms.

Figure 1:
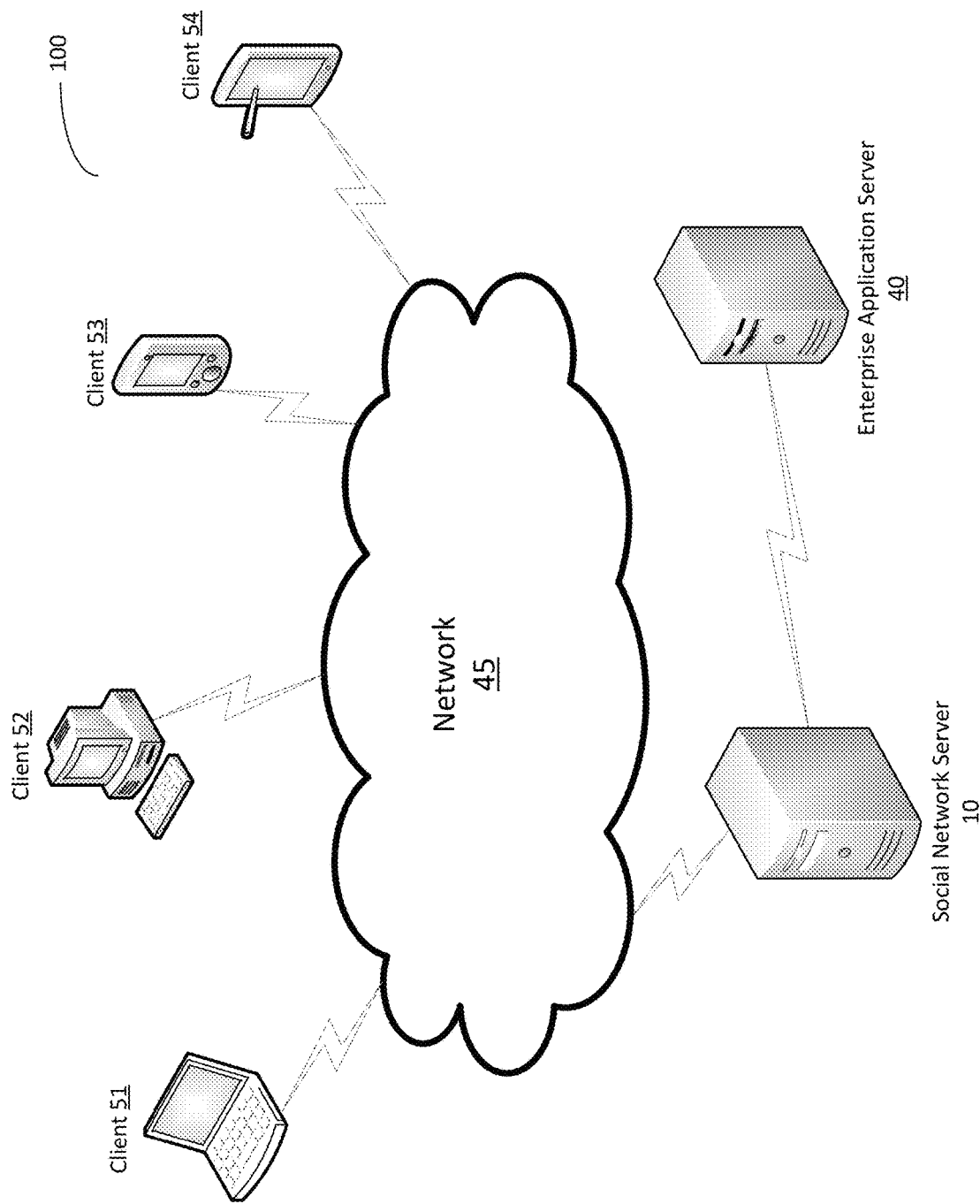
FIG. 1 is an overview block diagram of an example of a social network in accordance with embodiments of the present invention.

FIG. 1 is an overview block diagram of an example of a social network 100 in accordance with embodiments of the present invention. Social network 100 includes a social network server/system 10 coupled to client devices 51-54 through a network 45. Network 45 can be any type of communication network, such as the Internet or an Intranet or other private network. Client devices 51-54 can be any type of device that allows a user to interface with server 10, including a laptop computer 51, a desktop computer 52, a smart phone 53, a tablet 54, etc., using a wired or wireless connection, or any other method. Further, in other embodiments, a user can interface directly with server 10 (i.e., not via a network) through a directly coupled client device (not shown). Client devices 51-54 execute a web browser or other functionality that provides an interface with server 10.

Social network server/system 10, in conjunction with the other devices of FIG. 1, substantially provides the functionality of a social network, as disclosed in more detail below. Social network server 10 is coupled to an enterprise application server 40. Enterprise application server 40 in one embodiment is a server or servers that execute enterprise applications, such as human resource ("HR") applications, customer relationship management ("CRM") applications, enterprise resource planning ("ERP") applications, etc. In one embodiment, the enterprise applications on server 40 are the "E-Business Suite" or "Fusion" applications from Oracle Corp. Server 10 can be directly coupled to server 40, or can be coupled in any other way such as over a network. In addition, the functionality of server 40 can be included on server 10. Further, server 40 can be coupled to clients 51-54 directly through a network or other means rather than through server 10. Server 40 is generally not part of social network 100, but provides the business objects and system-of-records that are used to generate social objects.

Figure 2:
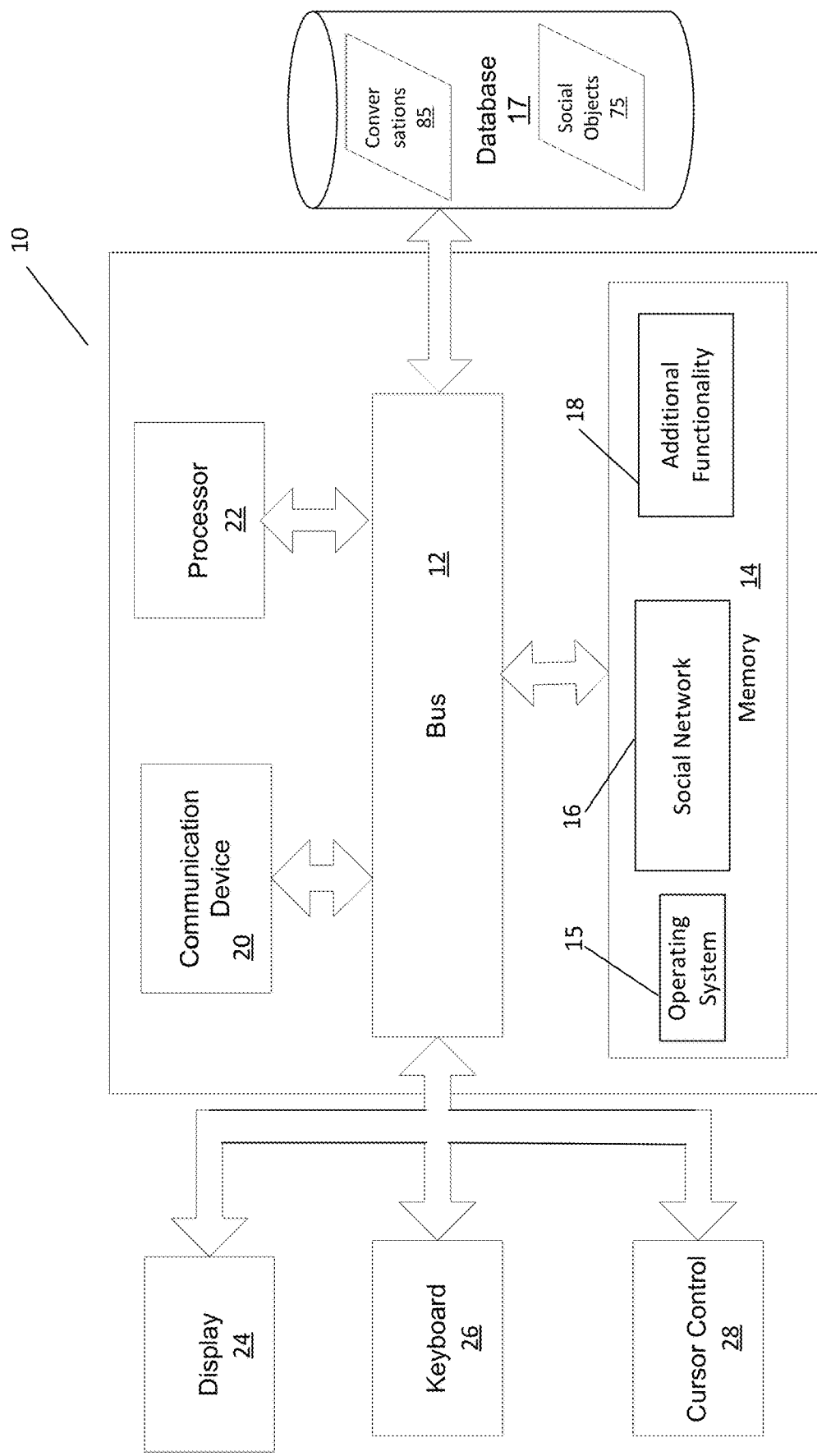
FIG. 2 is a block diagram of the social network server/system of FIG. 1 in accordance with an embodiment of the present invention.

FIG. 2 is a block diagram of social network server/system 10 of FIG. 1 in accordance with an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a social network module 16 for providing social network functionality and an relevant search results, as disclosed in more detail below. System 10 can be part of a larger system, such as an ERP system, if that functionality is not already provided by server 40 of FIG. 1. Therefore, system 10 can include one or more additional functional modules 18 to include the additional functionality. A database 17 is coupled to bus 12 to provide centralized storage for modules 16 and 18 and store data such as user profiles, social objects 75, conversations 85, etc. Storage of these items can also be done remote from system 10.

In one embodiment, social network 100 of FIG. 1 is a secure enterprise collaboration and social network software application and platform designed to facilitate social interactions within the enterprise environment (as opposed to a consumer environment) connecting people, applications and business processes within and across businesses. Social network 100 includes user profiles, conversations 85 and social objects 75.

A "conversation" in social network 100 in one embodiment is a persistent, shared stream of posts and comments (i.e., messages) including, for example, text, rich-text, documents, audio, video, programmatic content (referred to as "gadgets"), etc. A conversation has a defined membership ranging from "Private" (i.e., membership of one/self), through N-members consisting of individuals and or groups of individuals or sub-groups, to "Public" with visibility open across all members of social network 100. Posts within a conversation are viewed with new posts beneath old posts (i.e., multiple posts can be read as text on a page in a book), or vice versa, or in any type of hierarchical format.

One embodiment generates social objects. All data from enterprise applications and business processes can potentially be socialized as a "social object." Social objects contain records from a business application or process (referred to as a "system of record") that are mapped as a visual and programmatic integration into social network 100 via social network server 10. For example, a sales opportunity from within a CRM enterprise application (e.g., the name of a sales prospect and related data for the sales prospect, such as the estimated probability that a sale will close, the expected revenue of the sale, etc.) is integrated into social network 100 as a social object. As a result, social objects are explicitly coupled with conversations, where the social object can be discussed in context, and a record of that discussion can be retained for future viewing.

In one embodiment, a social object in social network 100 includes one or more of the following:

A set of programmatic rules defining the behavior of the integration and actions on receiving business events from the object within the system-of-record (i.e., the business object in the enterprise application).

A "wall" (i.e., a stream of posts) displaying publication of changes in the data set of the associated object from within the system-of-record and status posts from members/users of social network 100 with appropriate access rights. The wall provides an activity stream holding short, sometimes unrelated posts in which old information may scroll off the bottom of the list. The wall differs from a conversation in which all content is related.

A set of related conversations or other social objects (e.g., a "Customer" social object can be related to multiple "Opportunity" social objects).

A membership potentially defined, controlled and managed by the system-of-record or open to sharing across the network with individuals and groups.

A "gadget" storing data from the associated object within a system-of-record allowing quick access and updates to the original data set within the system-of-record (e.g., the revenue value of a CRM opportunity is displayed within a gadget and a member with access to the corresponding opportunity social object and the appropriate access rights within the system of record can update the revenue value in the system-of-record from the gadget tied to the social object within social network 100).

A social object may be generated for social network 100 for any business object of an application that users may desire to collaborate on over social network 100. Examples of social objects include (1) an "Opportunity" social object from a CRM application; (2) a "Customer" social object from a CRM application; (3) a "Service Request" social object from a CRM application; (4) a "Business Process Shipment Escalation" social object from a business process application; (5) a "Portal" subject social object from a web portal application; (6) a "General Ledger Period Close" social object from a financial/ERP application; (7) an "Inventory Item" social object from an inventory/ERP application; and (8) an "Ordered Product" social object from a distributed order orchestration application (e.g., "Fusion Distributed Order Orchestration (DOO)" application from Oracle Corp.).

In one embodiment, a conversation for social network 100 can be created for any collaborative purpose, including having a specific discussion, making a decision or resolving a problem. A conversation can be related to a social object. The conversation can have membership which is identical, a superset or a subset of the social object membership. For example, a conversation can be created that is related to a sales opportunity social object in which the sales team works on preparing the presentation for the customer. A second related conversation can be created in which only the sales lead works with the legal team in reviewing contractual changes requested by the customer. Through related conversations, multiple, parallel threads of work between different constituent parties all related to the changing of state of an object within the system-of-record (e.g., the opportunity changes from a state of "Negotiation" to a state of "Won") is achieved while maintaining the relationship, understanding and contextual persistent of the collaboration that drove the changes. For example, related conversations for an Opportunity social object may include a conversation for preparing a presentation, with the suggested presentation content and best practice notes for delivery, and a conversation for finalizing the contract with the appropriate draft contract for the deal size, industry, product and sales region with the associated legal team member added. A social object can also be related to another social object.

Figure 3:
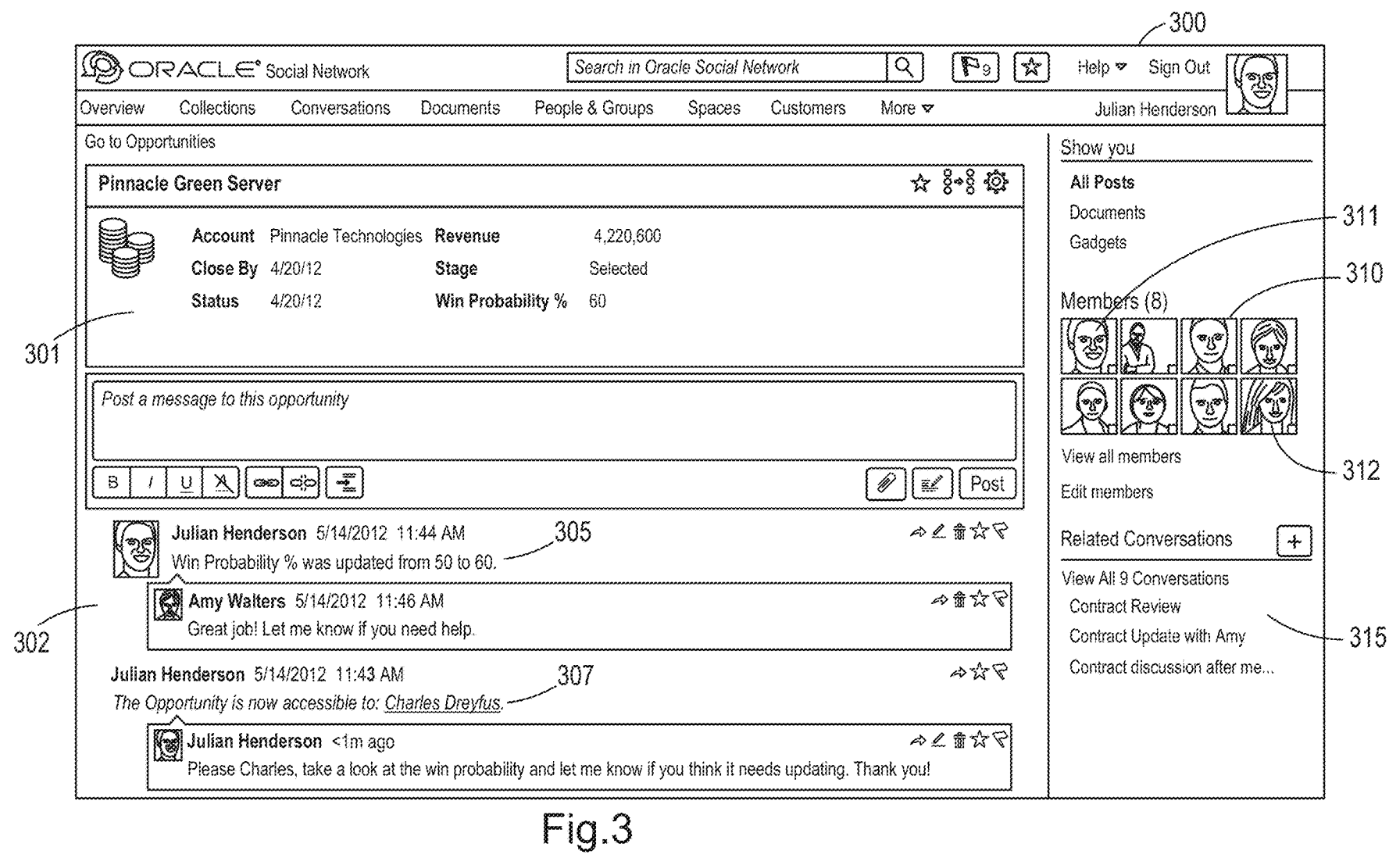

FIG. 3 is a screenshot showing an example social object 300 in accordance with one embodiment of the present invention. Social object 300 shown in FIG. 3 is an Opportunity social object for a "Pinnacle Green Server" product. As shown at 301, information or properties for social object 300 includes the account name ("Pinnacle Technologies"), the expected date of close of the opportunity (Apr. 20, 2012), the expected revenue from the opportunity ($4,220,600), and the probability of success or "win" (60%). The information at 301 is comprised of the properties from the system-of-record of a CRM system that may be external to social network system 100, such as from server 40 of FIG. 1. The properties of 301 are automatically updated as they are updated/changed in the CRM enterprise system. Further, in one embodiment, the properties can be edited in social object 300, and the edits/changes automatically update the properties in the system-of-record of the enterprise system. Therefore, the updating of data/properties can flow in both directions: from the enterprise application to the social network, and vice versa.

Social object 300 further includes a wall 302 that shows a history of all of the changes that have occurred on the social object. For example, at 305, the win probability is shown to have been updated by "Julian Henderson" from 50% to 60% on May 14, 2012 at 11:44 a.m. At 307, a new member, "Charles Dreyfus" was given access to the social object on May 14, 2012 at 11:43 a.m.

Social object 300 further includes a list of all members of the social object at 310. The members who are currently online for that social object (e.g., member 311) are shown with a typical thumbnail picture, but members who are currently offline (e.g., member 312) are shown as a grayed out thumbnail picture.

Social object 300 further includes a list of all conversations related to social object 300 at 315. A user can view one of the conversations by selecting the conversation. In one embodiment, social object 300 and new related conversations such as related conversations 315 are created when the user is interacting with the external or third party enterprise system such as a CRM or ERP system executing on, for example, server 40 of FIG. 1. For a given business object within a system-of-record of an enterprise application, a social object and a customized set of related conversations with content can be created programmatically (e.g., as a pre-defined template) to assist with the collaboration required to change the state of the system-of-record. In one embodiment, an application programming interface ("API") from the enterprise application to the social network application allows changes in the system-of-record to be communicated to the social network system, and vice versa. A selectable list of other social objects that are related to social object 300 can also be displayed.

Figure 4:
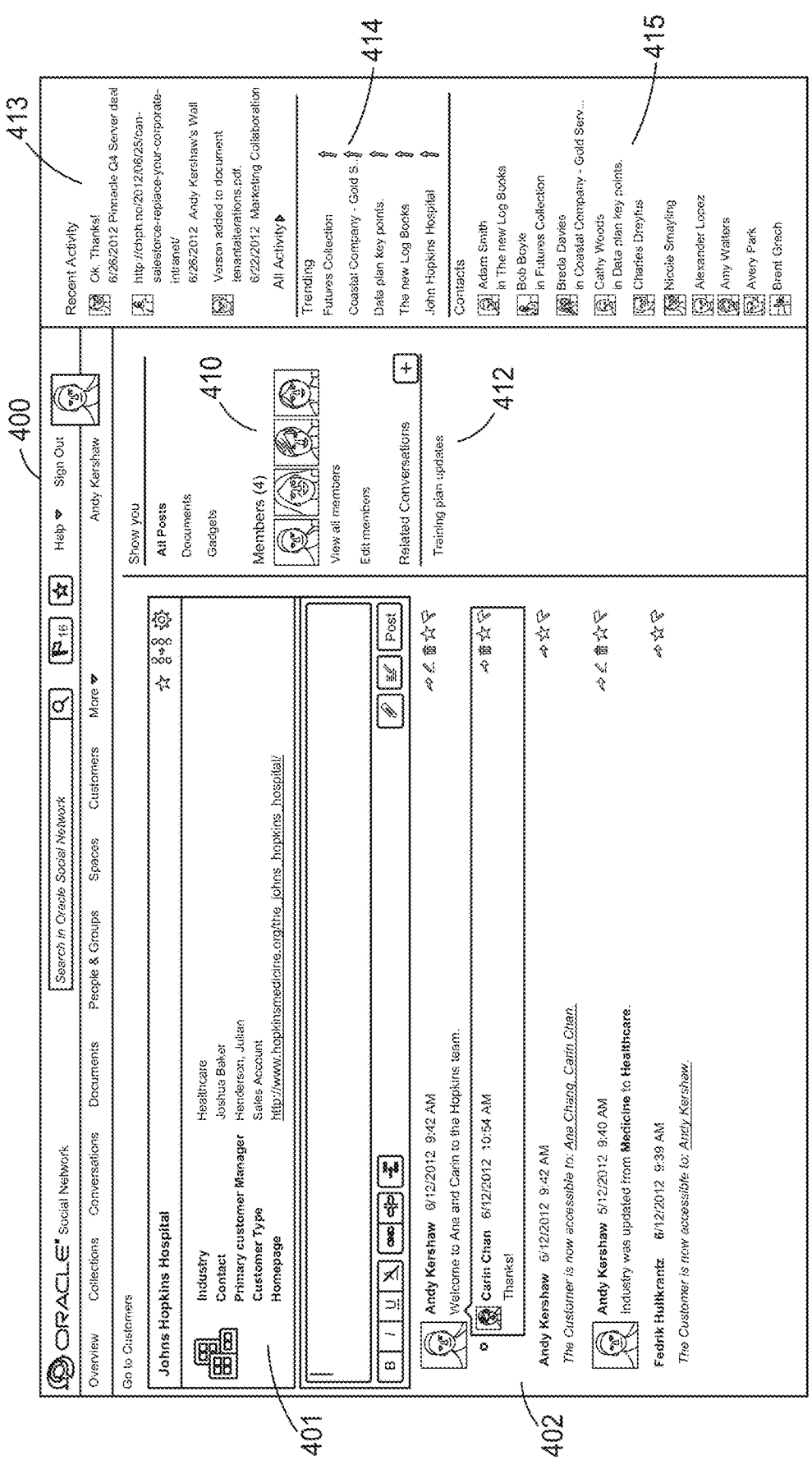
FIG. 4 is a screenshot showing another example social object in accordance with one embodiment of the present invention.

FIG. 4 is a screenshot showing another example social object 400 in accordance with one embodiment of the present invention. Social object 400 shown in FIG. 4 is a Customer social object for a customer named "Johns Hopkins Hospital". The customer in one embodiment is generated from a business object and updated from a system-of-record of a CRM system. The information properties for social object 400 are shown at 401, and the wall is shown at 402. Social object 400 further includes a display of members at 410 and a list of related conversations at 412. Social object 400 further includes a listing of recent activity at 413, trending activity at 414, and selectable contact information for each member at 415 (which may be the members of social object 400, or a list of contacts specific to each user).

Figure 5:
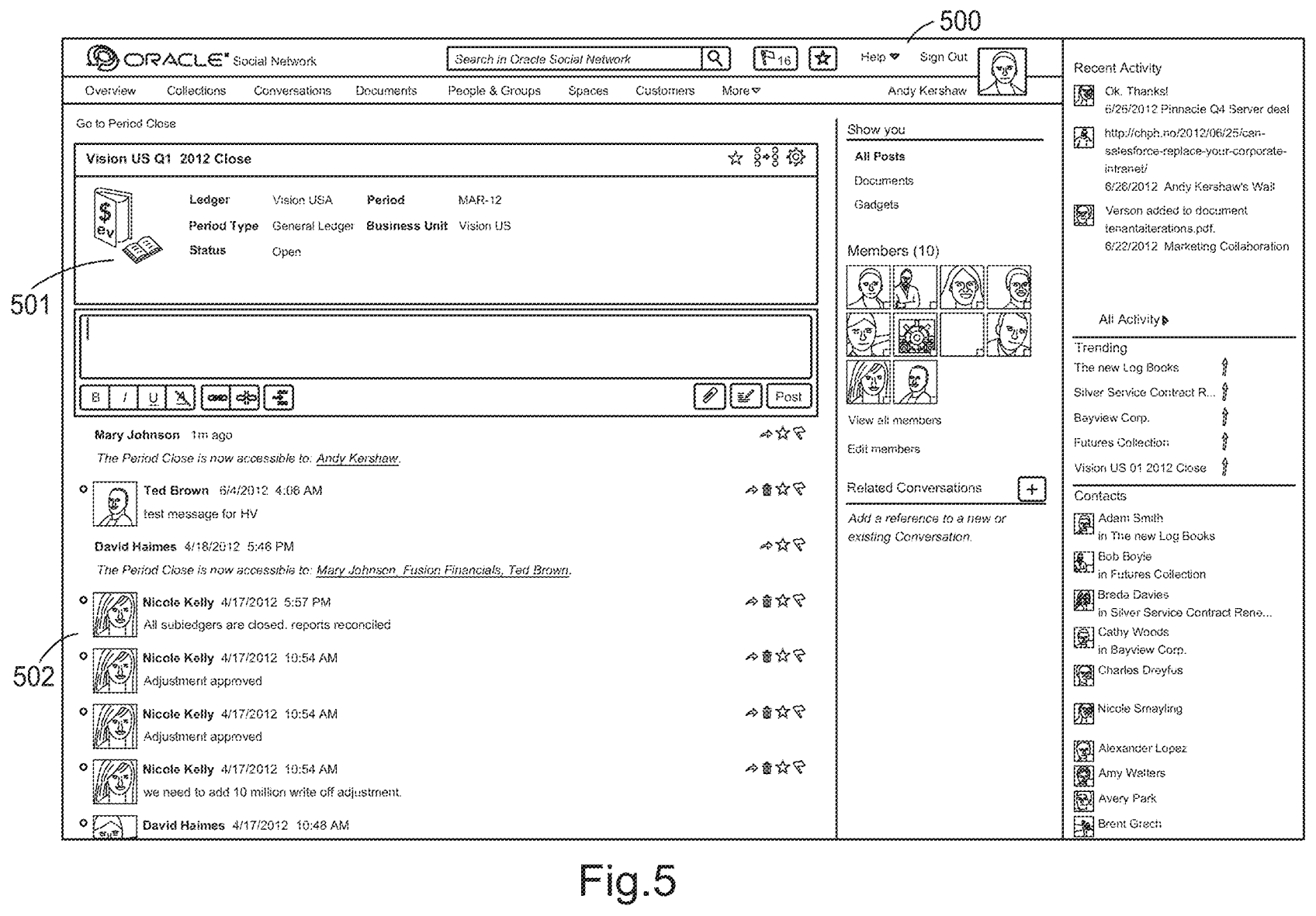

FIG. 5 is a screenshot showing another example social object 500 in accordance with one embodiment of the present invention. Social object 500 shown in FIG. 5 is a General Ledger Period Close social object for the "Vision US Q1 2012" period close. The period closing financial information in one embodiment is generated from a business object and updated from a system-of-record of a financial/ERP system. The information properties for social object 500 are shown at 501, and the wall is shown at 502. Social object 500 further includes the same elements as social object 400 of FIG. 4

Figure 6:
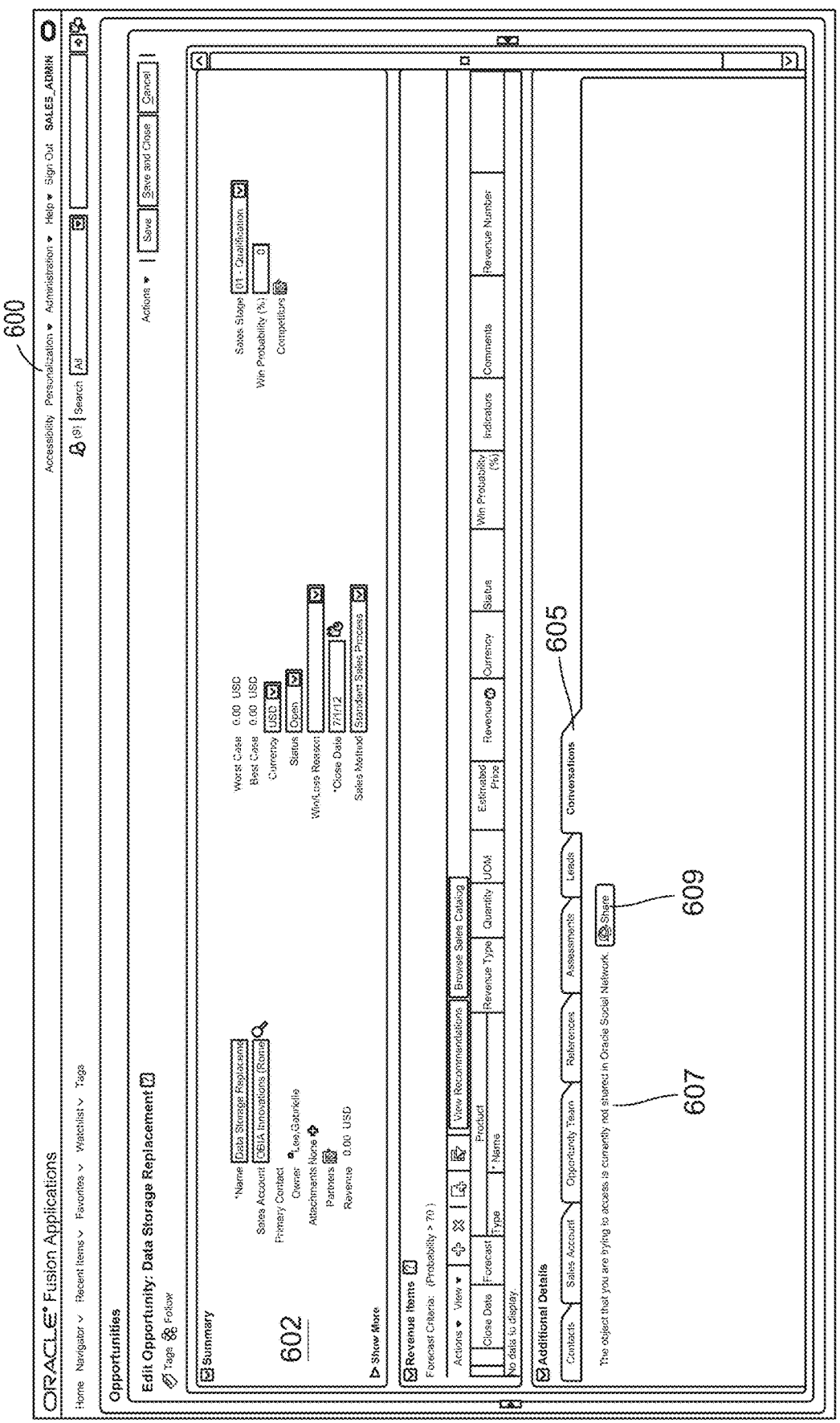
FIG. 6 is a screenshot showing an example business object within an enterprise application in accordance with an embodiment of the present invention.

FIG. 6 is a screenshot showing an example business object 600 within an enterprise application in accordance with an embodiment of the present invention. Business object 600 is an "Opportunity" object named "Data Storage Replacement" within a CRM system. The summary section 602 provides the system-of-record properties for the object. Business object 600 provides links to a corresponding social object in social network 100. Specifically, a tab 605 can be selected to create a conversation related to the corresponding social object. When tab 605 is selected, an API to social network server 10 and social network 100 is used to provide the integration.

In the example of FIG. 6, tab 605 is selected to generate a conversation. However, because the object is not yet shared, a message 607 indicates that the object is not yet shared, and a "Share" button 609 is provided to share the object. Sharing the object causes a social object to be generated that corresponds to business object 600. An API to social network server 10 and social network 100 is used to generate the social object.

Figure 7:
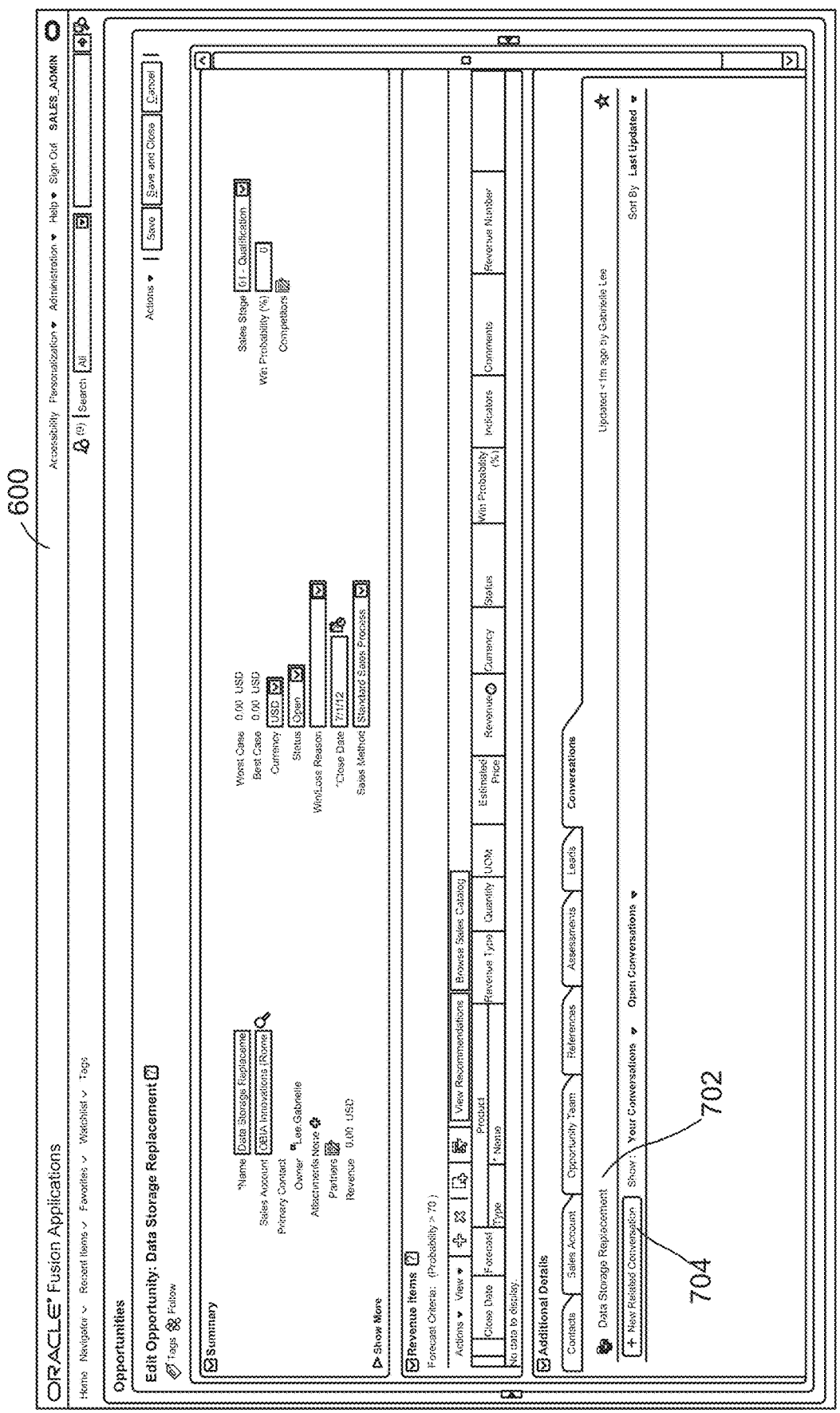
FIG. 7 is a screenshot showing the example business object of FIG. 6 after the share button has been selected in accordance with an embodiment of the present invention.

FIG. 7 is a screenshot showing the example business object 600 of FIG. 6 after Share button 609 has been selected in accordance with an embodiment of the present invention. As shown at 702, a "Data Storage Replacement" social object has been created in social network 100. Business object 600 further includes a "New Related Conversation" button 704 that can be selected to create a new conversation related to the corresponding "Data Storage Replacement" social object.

Figure 8:
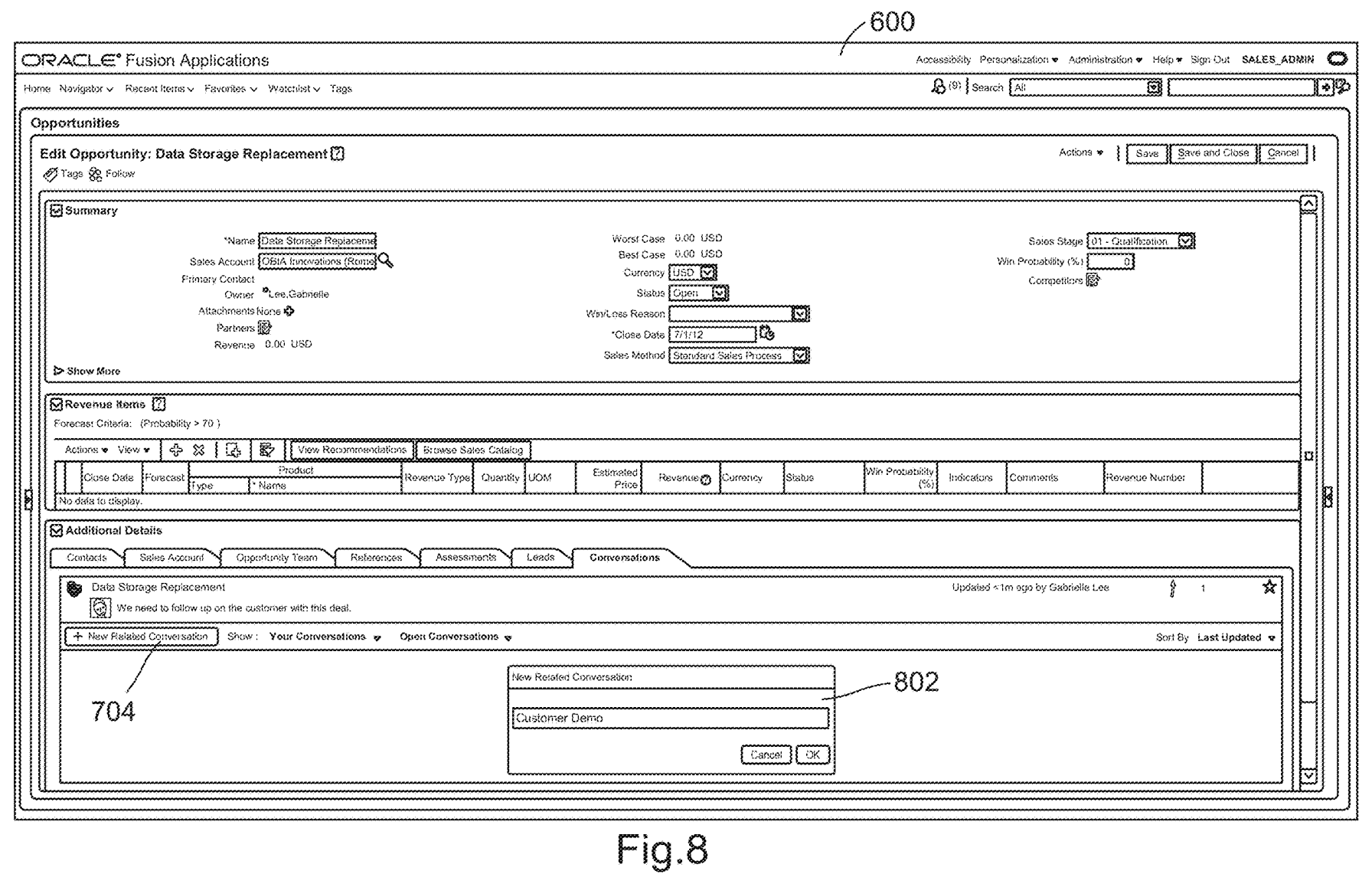

FIG. 8 is a screenshot showing the example business object 600 of FIG. 7 after New Related Conversation button 704 has been selected in accordance with an embodiment of the present invention. A window 802 pops up and the user can enter the name of the new conversation (e.g., "Customer Demo").

Figure 9:
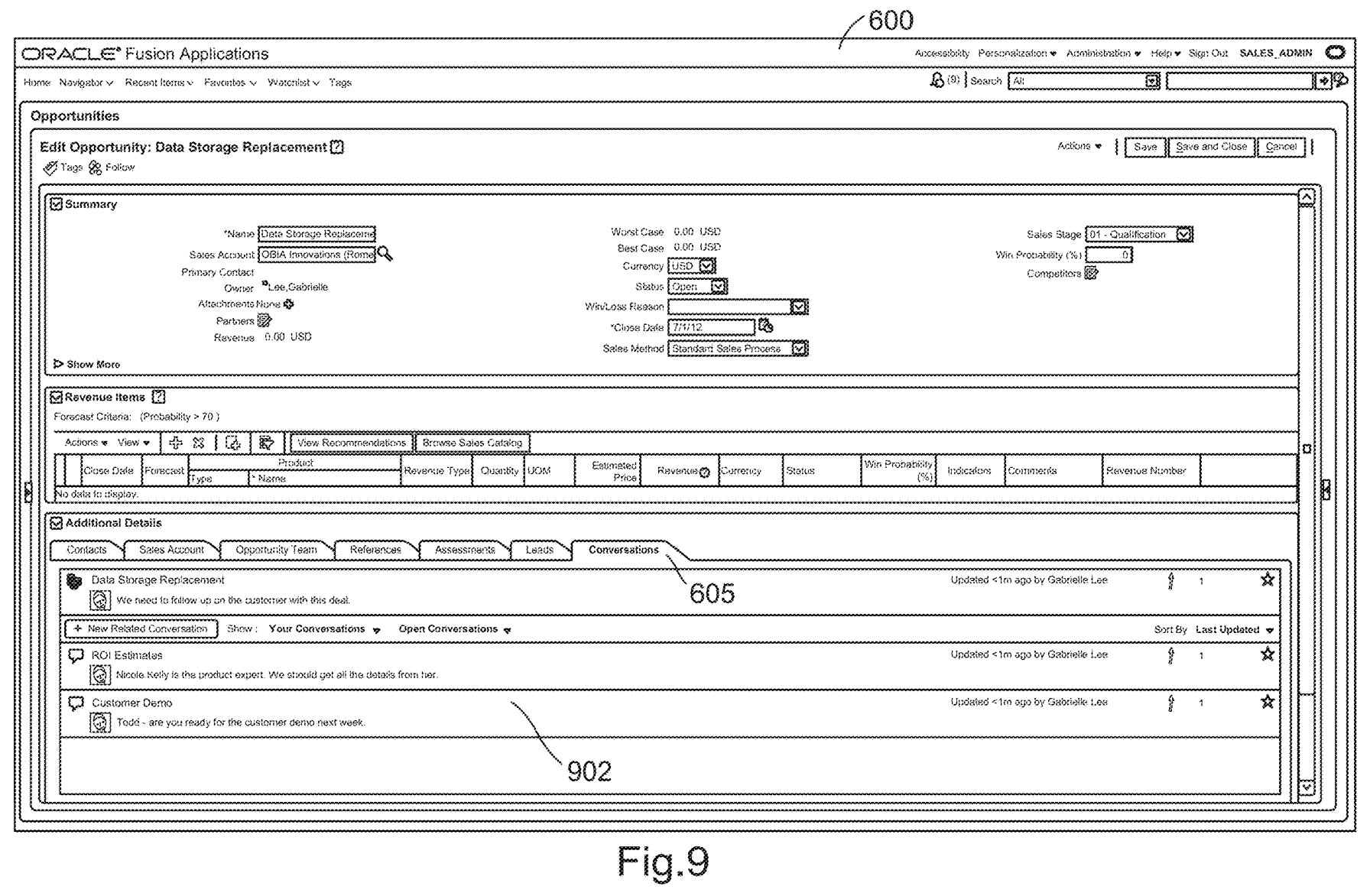

FIG. 9 is a screenshot showing the example business object 600 of FIG. 6 after conversations tab 605 is selected in accordance with an embodiment of the present invention. When tab 605 is selected, now that a social object has been created, all related conversations are displayed at 902. As shown, for the Data Storage Replacement social object, there are two related conversation: "ROI Estimates" and "Customer Demo." In FIG. 9, the related conversations are viewed in-context within the associated system-of-record. However they also may be viewed from within social network 100, as shown in FIG. 3, where the related conversations will be listed for user selection at 315 of FIG. 3.

Figure 10:
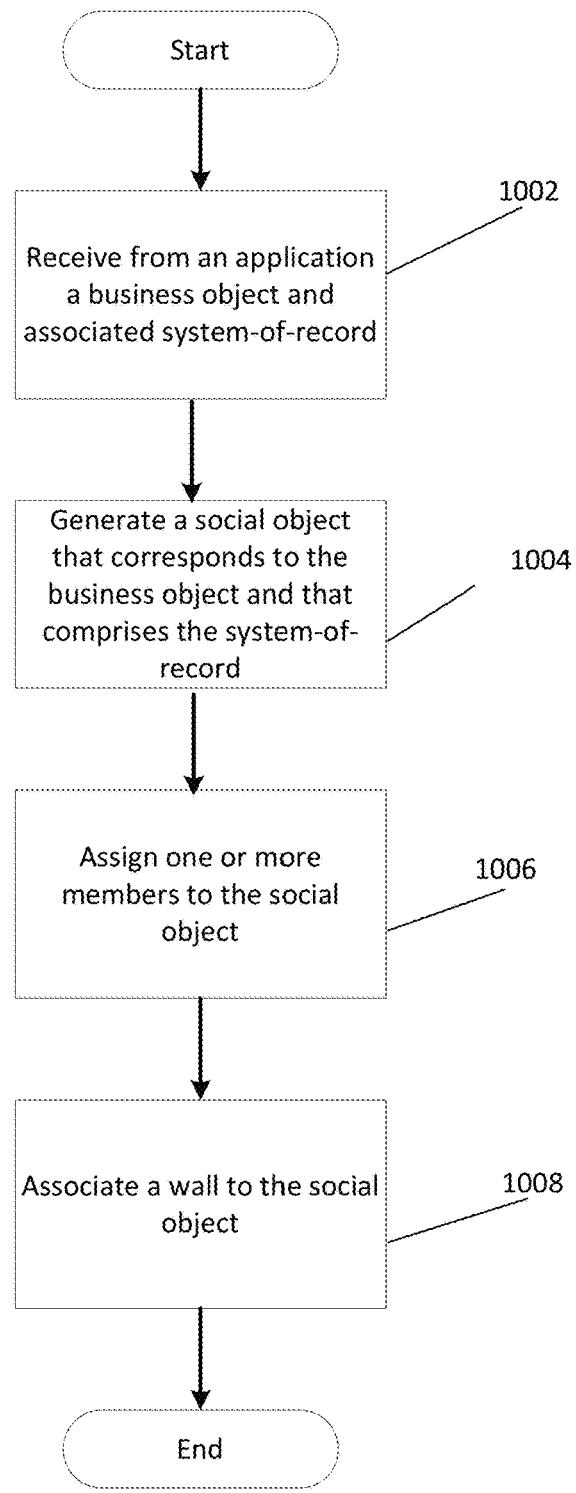
FIG. 10 is a flow diagram of the functionality of the social network module of FIG. 2 when generating a social object from a business object in accordance with one embodiment.

FIG. 10 is a flow diagram of the functionality of social network module 16 of FIG. 2 when generating a social object from a business object and system-of-record in accordance with one embodiment. In one embodiment, the functionality of the flow diagram of FIG. 10, and FIGS. 11 and 17 below, is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 1002, social network module 16 receives from an application a business object and associated system-of-record. In one embodiment, the application is an enterprise application such as a CRM or ERP application. An example of a system-of-record for a business object is shown in section 602 of FIG. 6. An API to social network server 10 and social network 100 of FIG. 1 is used to receive the business object.

At 1004, social network module 16 generates a social object that corresponds to the business object and that comprises the system-of-record. An example of a social object is social object 300 of FIG. 3, in which the system-of-record is shown in section 301.

At 1006, social network module 16 assigns one or more members to the social object. An example of assigned members are members 310 of social object 300 of FIG. 3.

At 1008, social network module 16 associates a wall to the social object. The wall displays changes to the system-of-record. An example of a wall is wall 302 of social object 300 of FIG. 3.

Figure 11:
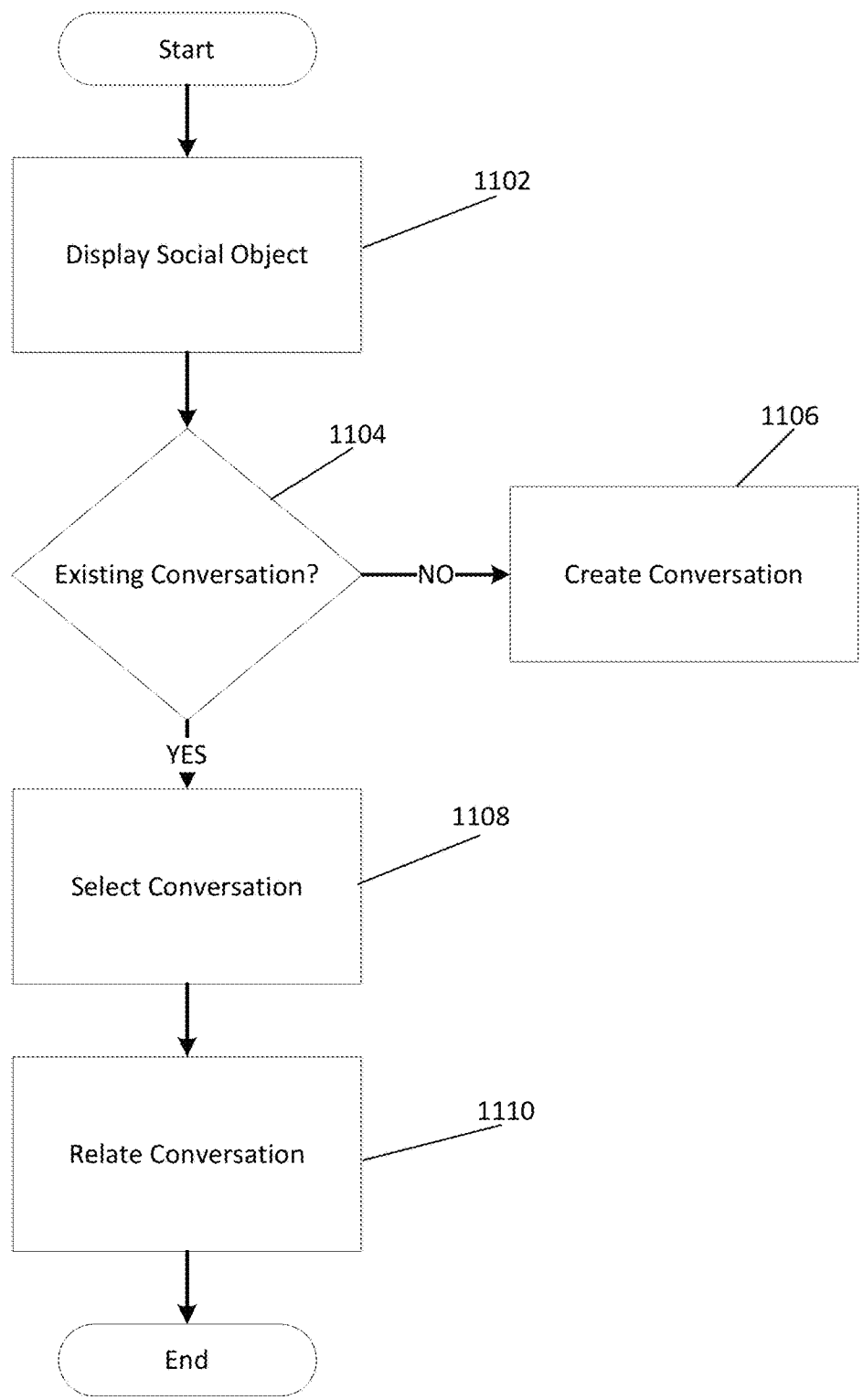
FIG. 11 is a flow diagram of the functionality of the social network module of FIG. 2 when relating a conversation to a social object in accordance with one embodiment.
Figure 12:
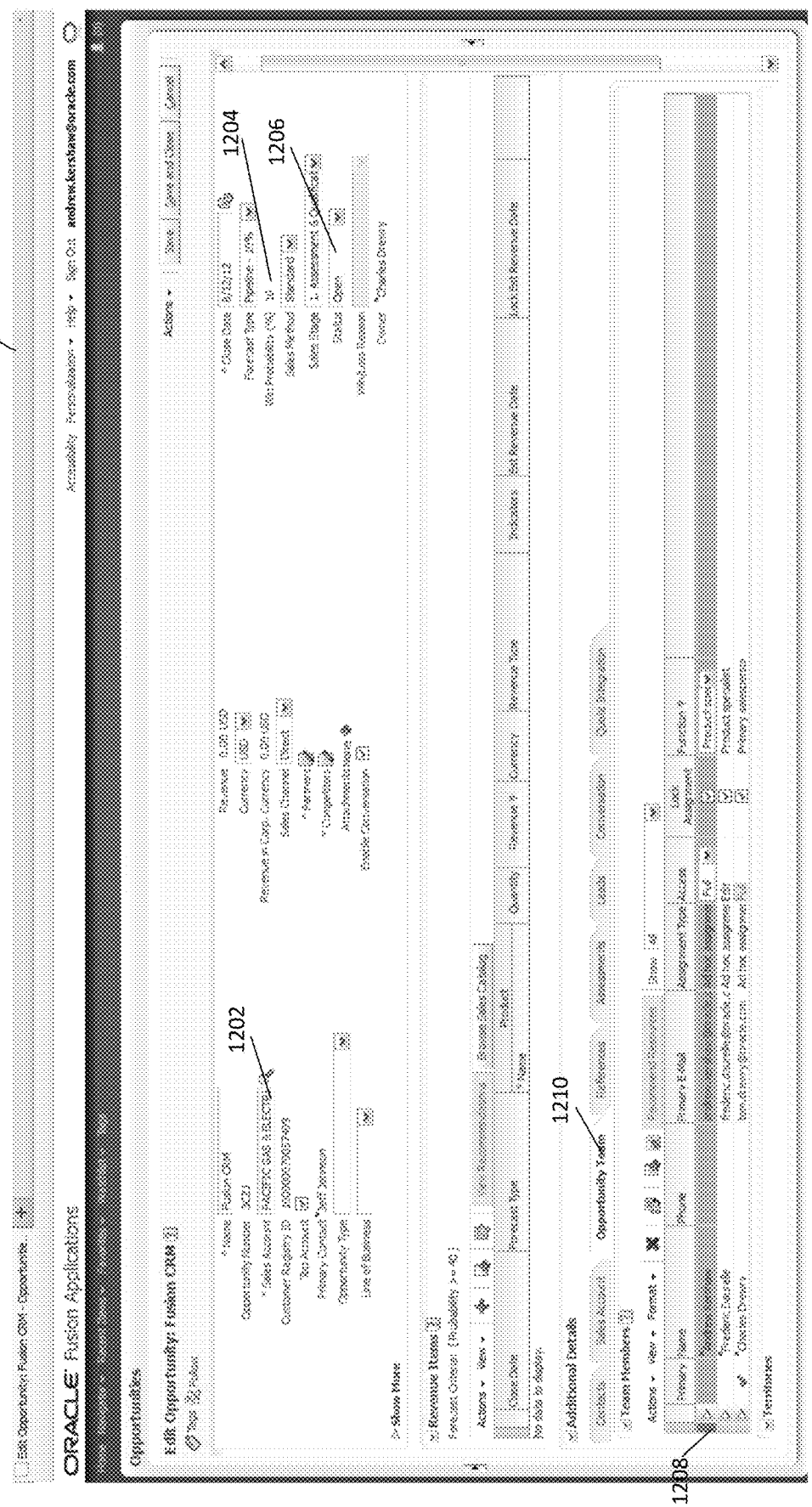
FIG. 12 is a screenshot showing an example business object for a CRM system-of-record.
Figure 13:
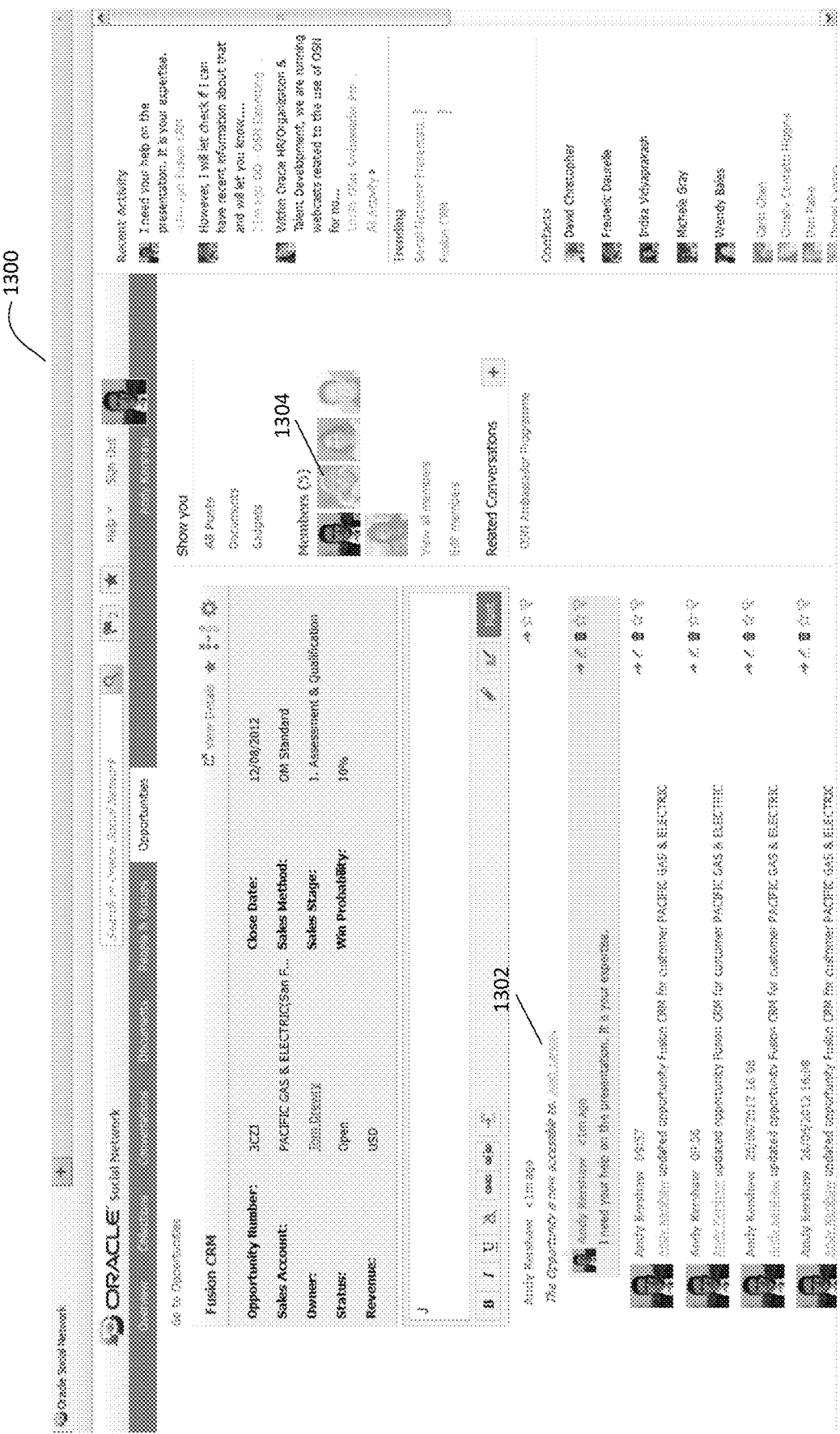
FIG. 13 is a screenshot showing a social object that corresponds to the business object of FIG. 12 for the CRM system-of-record.

FIG. 11 is a flow diagram of the functionality of social network module 16 of FIG. 2 when relating a conversation to a social object in accordance with one embodiment.

At 1102, the social object is displayed (assuming it has been created) with the system-of-record. For example, as shown in FIG. 7, social object 702 is displayed within the system-of-record for data storage replacement opportunity.

At 1104, it is determined if there are any existing conversations for the social object. If no at 1104, a conversation is created at 1106. The new conversation at 1106 is automatically related to the social object.

If conversations exist 1104, the conversation is selected at 1108, and the conversation is then related to the social object at 1110.

The functionality of FIG. 11 can be performed within an enterprise application, as shown in FIGS. 6-9, or within social network 100. An API to social network server 10 and social network 100 is used to provide the integration of FIG. 11.

As disclosed, social network 100 allows a social object to be generated and one or more conversations can be related to the social object. The social object is a set of properties tied to a wall. These properties are directly connected to the object in the system-of-record, and are updated either when they are changed in the system-of-record directly, or through actions in social network 100. Changes made within social network 100 are pushed back to the system-of-record to keep the object's properties current at all times. All changes can be logged on the wall, and related conversations can easily be created to discuss specific issues concerning the social object. The social object can be exposed through any type of applications, including the web client, "Outlook" from Microsoft Corp., or other email applications, stand-alone embeddable clients, and all mobile clients.

Social network 100 includes a set of predefined integration mechanisms that enable the user to define how and what data is retrieved from the system-of-record, how to display that data in social network 100 (for example, through social objects) and who within social network 100 has access to the data.

These predefined mechanisms are built to handle the most common application chores, such as specifying membership lists in social network 100 and property sensitivity (i.e., not everyone should be able to see or update all properties without authorization), and updating properties in both directions. For example, when a social object property is updated in the system-of-record, that change is published in social network 100 based on the user permission rules that the user has defined.

Social objects are defined in social network 100 as records within a system-of-record, such as customer or service records from a CRM system. Social object records include metadata and a wall, which includes membership lists and related conversations. Social objects expose system-of-record information to users who interact with and collaborate around the data through a user interface of social network 100.

The social objects provide a uniform and collaborative view of information from all integrated system-of-record. The social objects provide a wide range of services and capabilities in one embodiment, including:

Displaying select metadata needed for collaboration via an extensible gadget, usually visible as part of a wall;

Receiving a data stream of important activities fed by an activity stream or a web service from a system-of-record;

Enabling users to post messages, create follow ups, and easily catch up with activity through persisted and related conversations;

Enabling controlled access and collaboration with others via membership lists and rules;

Linking to other social objects; and

Starting related conversations to the social object.

As an example of the functionality of a social object, after a CRM Opportunity social object retrieves a stream of data input from the social object's wall, the process may unfold as follows:

1. Changes in the Opportunity's status, forecast, and revenue are published to the Opportunity's Wall.
2. The new information is shared with a broader group of individuals, who provide more context to the Opportunity.
3. Users not directly tied to the CRM Opportunity team can now interact and react to the Opportunity's status. For example, if the Opportunity is won, that may be the Service organization's cue to take over and begin the implementation process. The Service organization can then publish that information on the Opportunity's Wall.

Communication also works in the other direction. When the Opportunity is updated from within social network 100, the change is reflected in the system-of-record as well. Before the change is made, social network 100 checks to ensure that the user has the right to update the object, from changing a simple property to changing the state of the object (for example from "Pending" to "Won"). There is no need to go back into CRM to update key fields as social network 100 automatically provides the updates.

Known social networks and other systems allow documents or messages to be searched using a search term. With known indexing and search techniques, the relevance of each individual message generally outranks the combination of message postings. For example, in response to a search of the word "patent", all messages that include "patent" may be retrieved. In a social network with a large number of participants, the returned messages can number in the hundreds or thousands, and it is difficult for the searcher to determine which messages are more relevant than others so the user can then navigate to the associated containing forum/conversation. In some known social networks, because there are disparate object types, such as long documents and short messages, the lengthier document will generally be seen as more relevant simply because it is longer, and more likely to include more than one occurrence of the search term(s).

Further, in general a typical search engine works by indexing content based on the frequency of "terms" within a "document". The set of documents to be searched is called a "corpus". When a query is entered, terms in the query are used to assign a relevance score to each document, the score is sorted, and those documents with the highest scores are deemed most relevant.

As discussed above, in one embodiment, interactions between network participants on social network 100 include a series of posted messages or other "content" (e.g., documents, images, presentations, etc.). Within social network 100, related messages are contained within a conversation 85. Embodiments of the present invention consider a single conversation that has many relevant messages, and fewer non-relevant messages, more relevant than other conversations in search results. One embodiment creates a new virtual "document" that is formed from a conversation's "content" consisting of all the chats/messages in the conversation, which in turn is then indexed as a whole, driving higher levels of relevance.

Embodiments consider a conversation as a collection of messages sent over a period of time in a single unit. The association of multiple messages can be done explicitly by the user or can be inferred from various attributes of the messages by social network 100. In a typical communication system, each message would be treated as a separate document for search purposes, even if the system was capable of aggregating the messages or other content into a conversation for presentation purposes. However, the relevance score produced for individual messages may not be an accurate reflection of the relevance of the conversation taken as a whole. Therefore, embodiments aggregate the set of messages or other content into a single conversation "document" for purposes of computing a relevance score, thus yielding more accurate and relevant search results to the user.

One embodiment indexes new conversations and messages in order to allow relevance searching. When a new conversation is created, by a user or an automated process, such as for example described in conjunction with FIG. 11 above, embodiments index the conversation name and metadata as the conversation's "document" (i.e., a virtual document that represents the conversation, referred to as a "conversation document").

When a new message or other content is added to a conversation, by a user or an automated process, embodiments: (1) Append the message to the conversation document; (2) Re-index the conversation document; and (3) Index the individual message as a separate document. When a message in a conversation is edited or deleted, embodiments: (1) Re-create the conversation document by concatenating the current versions of all messages; (2) Re-index the conversation document; (3) If a message was deleted, remove it from the search index; and (4) If a message was edited, index the edited message as a separate document.

Figure 15:
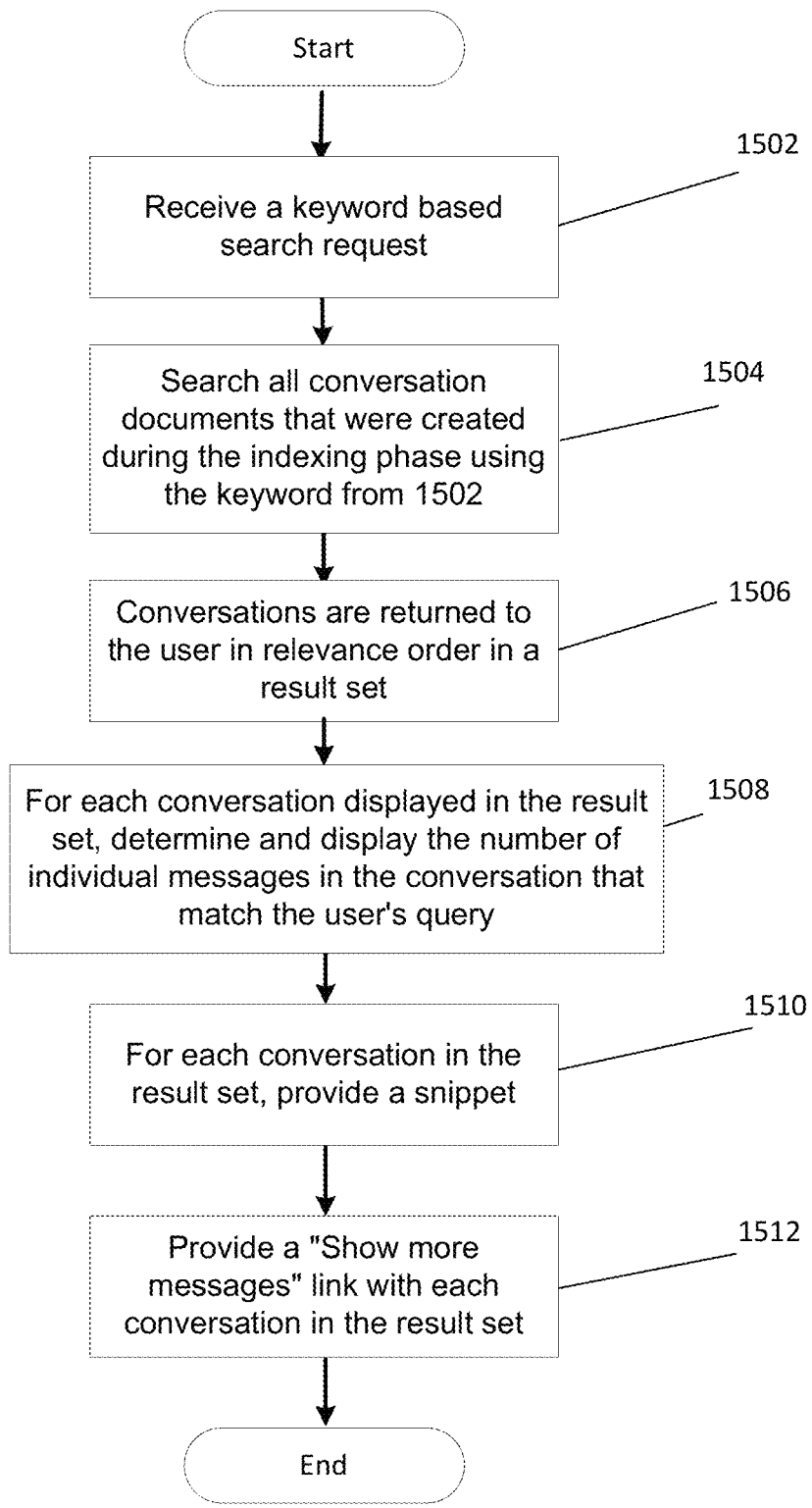
FIG. 15 is a flow diagram of the functionality of the social network module of FIG. 2 when performing a keyword search on the social network in accordance with one embodiment.

FIG. 15 is a flow diagram of the functionality of social network module 16 of FIG. 2 when performing a keyword search on social network 100 in accordance with one embodiment.

At 1502, a keyword based search request for conversation content is received. The search request will typically be provided by a user typing in one or more keywords in a search box.

At 1504, all conversation documents that were created during the indexing phase disclosed above are searched using the keyword(s) from 1502. In one embodiment, "Oracle Text" from Oracle Corp. is used to search the indexed conversation documents. Oracle Text uses standard Structured Query Language ("SQL") to index, search, and analyze text and documents stored in a database. In other embodiments, any other known text searcher can be used.

In response to the search at 1504, at 1506 conversations are returned to the user in relevance order in a result set, so that conversations that are most relevant to the user's query appear first in the results. In one embodiment, Oracle Text is used to determine a relevance score for the documents. To calculate a relevance score for a returned document in a word query, Oracle Text uses an inverse frequency algorithm based on "Salton's formula." Inverse frequency scoring assumes that frequently occurring terms in a document set are noise terms, and so these terms are scored lower. For a document to score high, the query term must occur frequently in the document but infrequently in the document set as a whole. In other embodiments, other methodologies used by known indexing engines can be used to determine the relevance of the documents.

At 1508, in one embodiment, for each conversation displayed in the result set, the number of individual messages or other content in the conversation that match the user's query, as well as the total number of messages in the conversation, is determined and displayed. In one embodiment, this number is not used for relevance computation at 1506 but is provided to the user for additional information about matches within the conversation.

At 1510, for each conversation in the result set, a "snippet" (i.e., a keyword in context) is provided. The snippet is a short fragment of the conversation document that shows the most relevant match for the user's query. The snippet may be provided by the underlying search engine. The snippet may be generated from the document name (or other metadata), or any of the messages that make up the conversation document.

At 1512, a "Show more messages" link with each conversation in the result set is provided, assuming there are more messages. Selecting this link will display the individual messages within that conversation that match the user's query.

Figure 16:
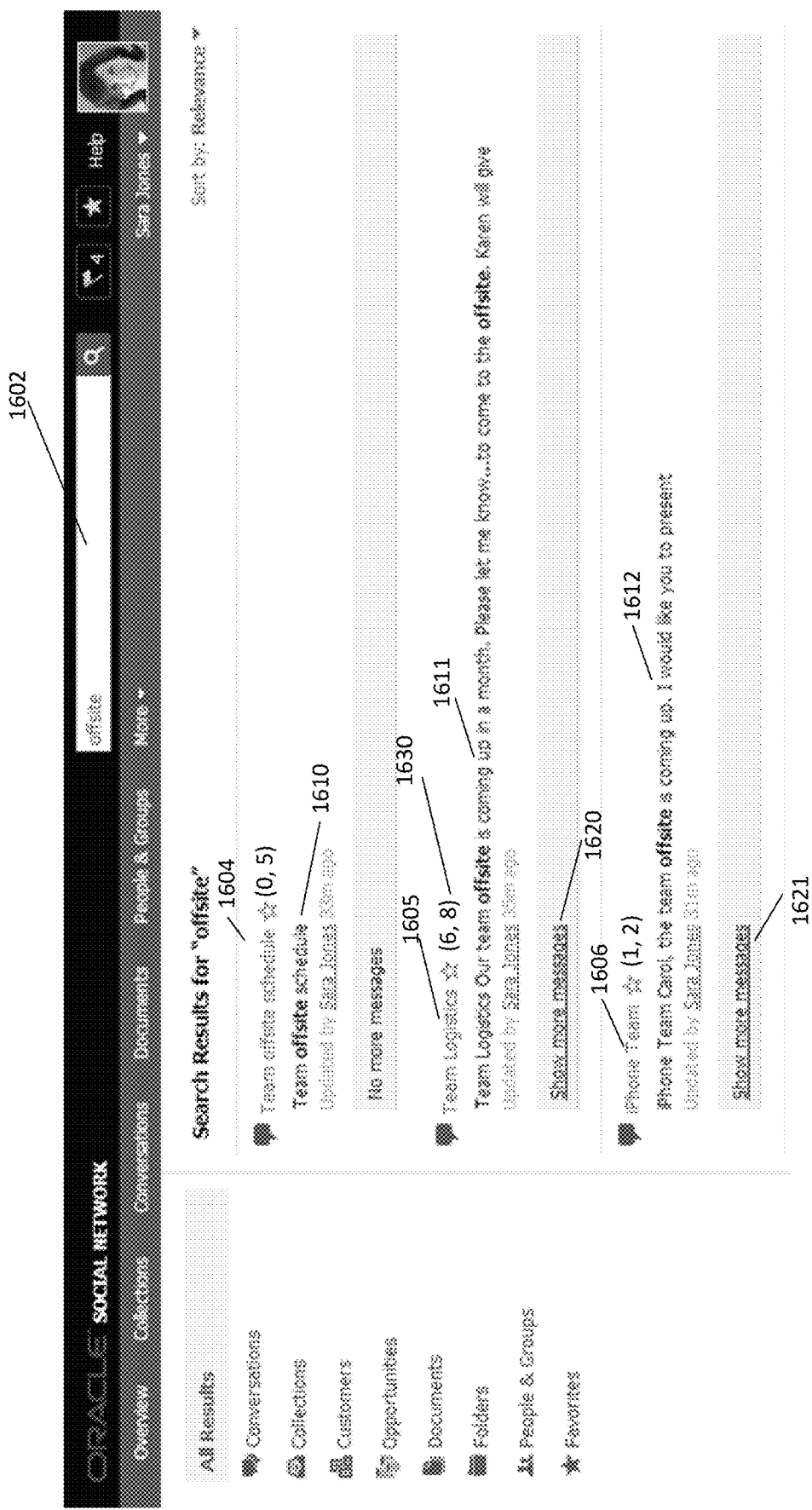
FIG. 16 is a screenshot showing results from an example search result set of conversation documents in accordance to one embodiment.

FIG. 16 is a screenshot showing results from an example search result set of conversation documents in accordance to one embodiment. As shown in FIG. 16, a user enters the search term "offsite" in search box 1602. The search result set, sorted by relevance, includes three conversations: "Team offsite schedule" conversation 1604, "Team Logistics" conversation 1605, and "iPhone Team" conversation 1606. Conversation 1604 is the most relevant even though it only includes a single document 1610 because that document includes the keyword in its title, which in one embodiment makes the conversation more relevant than conversations that have matches only in messages. A snippet of each document/message 1610-1612 is included with each conversation. Further, a "Show more messages" link 1620, 1621 is provided for a conversation if more messages are available. Further, an indication of the number of individual messages or other content in the conversation that match the user's query, as well as the total number of messages in the conversation, is determined and displayed. For example, for conversation 1605, there are 6 matched messages, and 8 total messages, as indicated at 1630.

Figure 17:
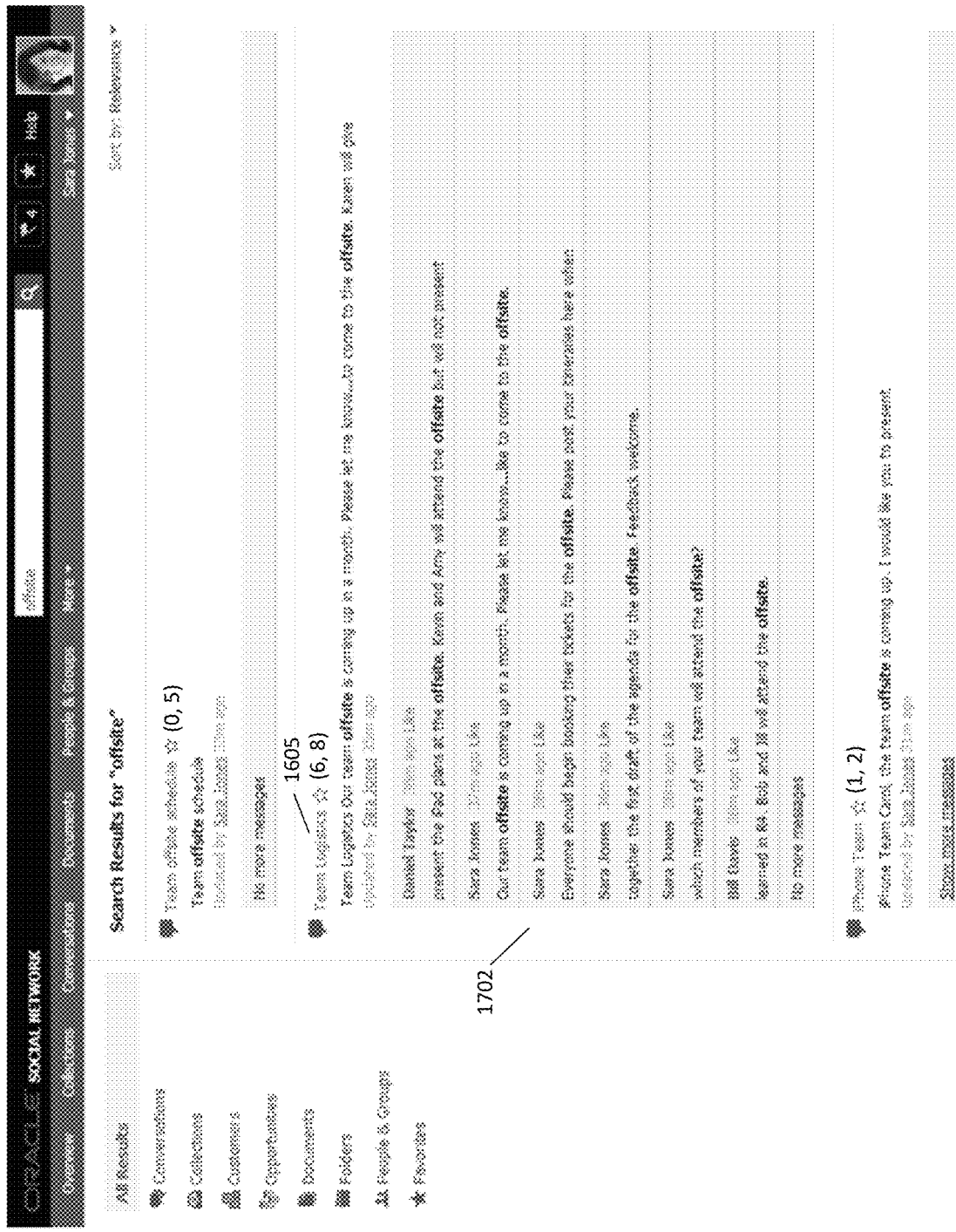
FIG. 17 is a screenshot showing results from an example search result set of conversation documents in accordance to one embodiment.

FIG. 17 is a screenshot showing results from an example search result set of conversation documents in accordance to one embodiment. FIG. 17 shows the results set from FIG. 16 after the "Show more messages" link 1620 has been selected. As shown, as a result all of the relevant messages for "Team Logistics" conversation 1605 are displayed at 1702.

As described, embodiments allow conversations to be considered conversation documents and individually indexed for search purposes, along with messages and other content. A keyword search results in the most relevant conversations rather than individual messages or content. The relevance of each conversation is based on the messages and content that form the conversation.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to provide a keyword search result set, the providing comprising:

receiving, by a social network that is provided by a first server, from an enterprise application, a business object and an associated system of record, wherein the enterprise application comprises a customer relationship management (CRM) system, the business object comprises a customer record within the CRM system, and the received system of record corresponds to a stored system of record for the customer record within the CRM system;

generating, in the social network, a social object that represents the business object and comprises a membership list that defines access to the social object by members of the social network, wherein changes to the social object by members in the membership list modify the stored system of record for the customer record within the CRM system;

generating a plurality of conversations coupled to the social object that each comprise individual messages, wherein the generated conversations each comprise a conversation membership list, and at least a portion of each conversation membership list matches at least a portion of the social object membership list;

aggregating messages in each conversation into a corresponding conversation document, wherein at least one conversation document includes aggregated messages between a plurality of parties;

indexing the conversation documents, wherein the aggregated messages within a given conversation document are indexed as a whole in order to index the given conversation document;

receiving a keyword search term;

searching for the keyword search term within the indexed conversation documents to generate a result set of conversations;

determining a relevance between the keyword search term and each conversation document in the result set; and displaying the result set of conversations based on the determined relevance in response to the searching.

2. The computer readable medium of claim 1, wherein the content comprises at least one of a message, a document or an image.

3. The computer readable medium of claim 1, wherein the response to the searching comprises a list of the messages for each conversation that include at least one occurrence of the search term.

4. The computer readable medium of claim 3, wherein the determined relevance between the keyword search term and each conversation document in the result set is based at least on a relative number of the aggregated messages within each conversation document that include at least one occurrence of the search term.

5. The computer readable medium of claim 4, wherein the determined relevance between the keyword search term and the conversation documents in the result set is determined based on an inverse frequency algorithm.

6. The computer readable medium of claim 1, further comprising displaying at least one of:
- a number of matched messages when the relevant conversations are displayed,
- a snippet for each displayed conversation, or
- a selectable link for each conversation that when selected displays all relevant content for a corresponding conversation.

7. The computer readable medium of claim 1, wherein changes to the social object are sent by the first server to the CRM system through an application programming interface (API) and changes to the stored system of record for the customer record within the CRM system are sent by the CRM system to the first server through the API.

8. The computer readable medium of claim 1, wherein when a new message is added to a conversation, the new message is appended to the corresponding conversation document and the corresponding conversation document is re-indexed, wherein when a message is edited or deleted from the conversation, the corresponding conversation document is re-created by concatenating current versions of messages in the conversation and the corresponding conversation document is re-indexed.

9. The computer readable medium of claim 1, wherein the conversation membership lists are identical to, a superset of, or a subset of the social object membership list.

10. The computer readable medium of claim 1, wherein a subset of the conversation membership lists are different from the social object membership list.

11. The computer readable medium of claim 10, wherein the conversation membership lists comprise one or more of private, n-members, and public, wherein private defines a membership list of one, n-members defines a membership list of a group of the n-members where n is a positive integer, and public defines an open membership list across members of the social network.

12. The computer readable medium of claim 1, wherein the membership list for the social object is at least partly defined by the stored system of record for the customer record within the CRM system.

13. The computer readable medium of claim 1, wherein the social object represents the business object that comprises a sales opportunity from within the CRM system, and at least a portion of the generated conversations represent multiple threads of work between different parties related to changing a state of the stored system of record for the customer record within the CRM system.

14. A computer implemented method for providing a keyword search result set, comprising:
- receiving, by a processor of a first server that provides a social network, from an enterprise application, a business object and an associated system of record, wherein the enterprise application comprises a customer relationship management (CRM) system, the business object comprises a customer record within the CRM system, and the received system of record corresponds to a stored system of record for the customer record within the CRM system;
- generating, by the processor, in the social network, a social object that represents the business object and comprises a membership list that defines access to the social object by members of the social network, wherein changes to the social object by members in the membership list modify the stored system of record for the customer record within the CRM system;
- generating, by the processor, a plurality of conversations coupled to the social object that each comprise individual messages, wherein the generated conversations each comprise a conversation membership list, and at least a portion of each conversation membership list matches at least a portion of the social object membership list;
- aggregating messages in each conversation into a corresponding conversation document, wherein at least one conversation document includes aggregated messages between a plurality of parties;
- indexing the conversation documents, wherein the aggregated messages within a given conversation document are indexed as a whole in order to index the given conversation document;
- receiving a keyword search term;
- searching for the keyword search term within the indexed conversation documents to generate a result set of conversations;
- determining a relevance between the keyword search term and each conversation document in the result set; and
- displaying the result set of conversations based on the determined relevance in response to the searching.

15. The method of claim 14, wherein the content comprises at least one of a message, a document or an image.

16. The method of claim 15, wherein the determined relevance between the keyword search term and each conversation document in the result set is based at least on a relative number of the aggregated messages within each conversation document that include at least one occurrence of the search term.

17. The method of claim 14, further comprising displaying at least one of:
- a number of matched messages when the relevant conversations are displayed,
- a snippet for each displayed conversation, or
- a selectable link for each displayed conversation that when selected displays all relevant content for the conversation.

18. A social network system comprising:
- a social object that represents a business object and an associated system of record received by a social network that is provided by a first server from an enterprise application, wherein the enterprise application comprises a customer relationship management (CRM) system, the business object comprises a customer record within the CRM system, and the received system of record corresponds to a stored system of record for the customer record within the CRM system, wherein the social object comprises a membership list that defines access to the social object by members of the social network, wherein changes to the social object by members in the membership list modify the stored system of record for the customer record within the CRM system;
- a plurality of conversations coupled to the social object that each comprise individual messages wherein the generated conversations each comprise a conversation membership list, and at least a portion of each conversation membership list matches at least a portion of the social object membership list;
- a social network module that comprises a processor and stored instructions that when executed by the processor implement:
  - an indexing module that aggregates messages in each conversation into a corresponding conversation document and indexes each conversation document, wherein at least one conversation document includes aggregated messages between a plurality of parties, and the aggregated messages within a given conversation document are indexed as a whole in order to index the given conversation document;

a keyword search module that receives a keyword search term and searches for the keyword search term within the indexed conversation documents to generate a result set of conversations; and a search results module that determines a relevance between the keyword search term and each conversation document in the result set and displays the result set of conversations based on the determined relevance in response to the searching.

19. The social network system of claim 18, wherein the content comprises at least one of a message, a document or an image.

20. The social network system of claim 19, wherein the determined relevance between the keyword search term and each conversation document in the result set is based at least on a relative number of the aggregated messages within each conversation document that include at least one occurrence of the search term.

\* \* \* \* \*